Sept 17, 1957     R. N. ECK ET AL     2,806,967
CONTROL MEANS FOR POWER OPERATED FORMING PRESSES AND THE LIKE
Filed June 9, 1954     3 Sheets-Sheet 1

Inventors.
Robert N. Eck
Edwin W. Deeger
By H. R. Rather
Attorney

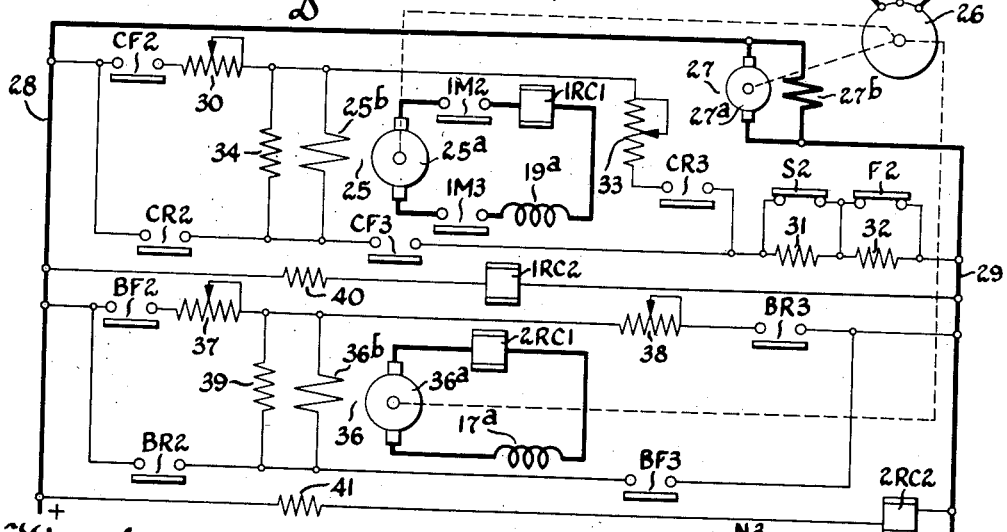
Fig. 3
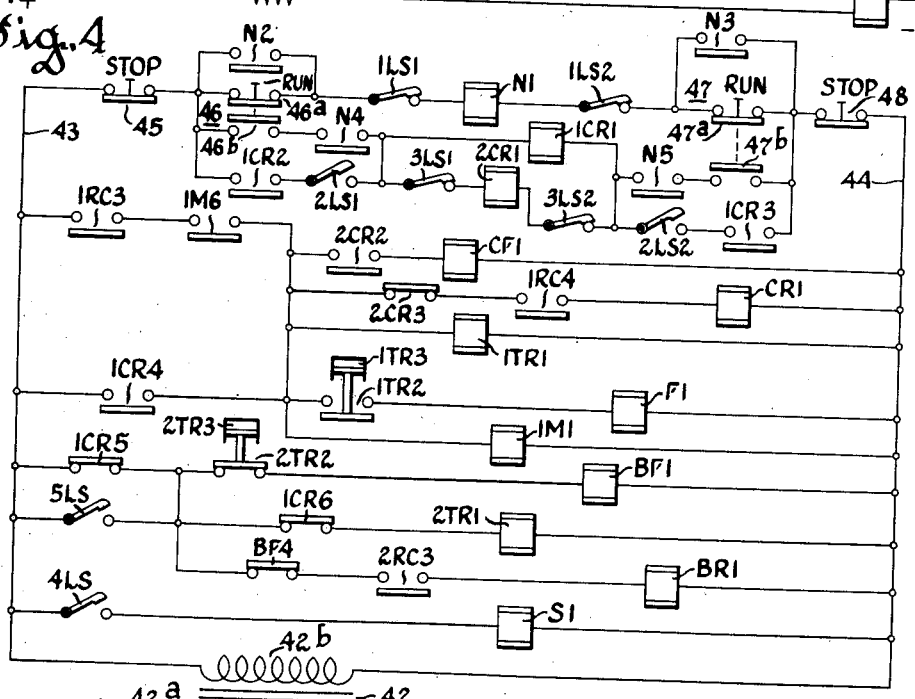
Fig. 4
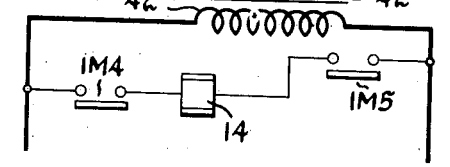
Inventors
Robert N. Eck
Edwin W. Deeger
By H R Rather
Attorney

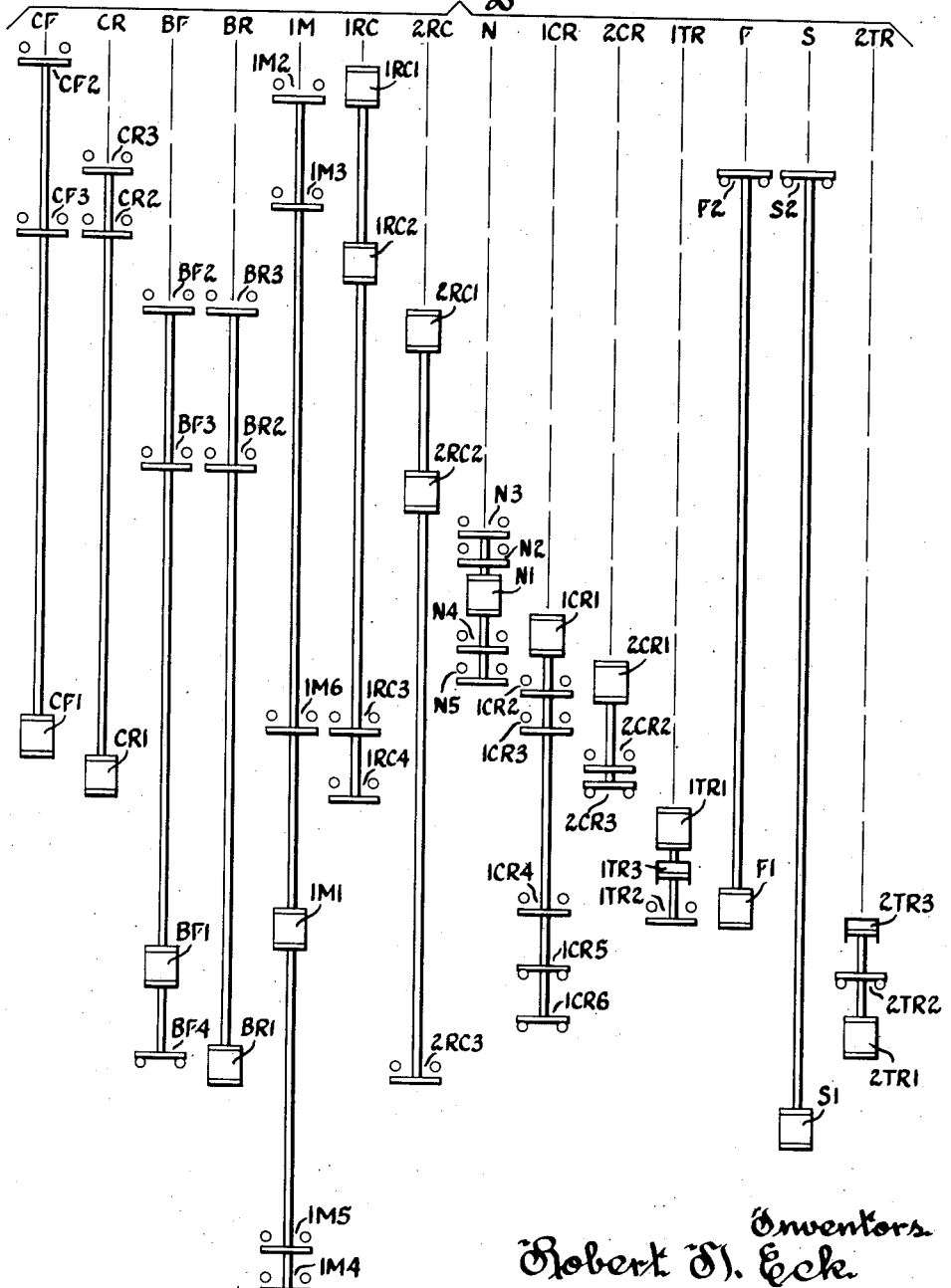

United States Patent Office 2,806,967
Patented Sept. 17, 1957

2,806,967
CONTROL MEANS FOR POWER OPERATED FORMING PRESSES AND THE LIKE

Robert N. Eck, Whitefish Bay, and Edwin W. Seeger, Wauwatosa, Wis., assignors to Cutler-Hammer, Inc., Milwaukee, Wis., a corporation of Delaware Application June 9, 1954, Serial No. 435,557

15 Claims. (Cl. 310—96)

This invention relates to control means for power operated forming presses and the like.

For certain applications there is an increasing demand for greater flexibility in control of the movement of a press ram during a working cycle. Increase in production rates makes it desirable that the press ram move rapidly toward and away from the work, before and after the tool or die part has performed its work. In certain types of deep-draw operations it is desirable that the die be brought into engagement with the work and perform the draw operation at a relatively slow rate. In order to obtain such flexibility of control it has been found advantageous to use clutches and brakes in conjunction with the ram operating shafts which are variable with respect to degrees of coupling and braking effort they afford. The so called magnetic flux type clutches and brakes, for example eddy current or magnetic particle clutches and brakes, have been found to be well suited for such control.

It is the object of the present invention to provide a control system for power operated presses and the like utilizing clutches and brakes of the aforementioned type together with a coordinated control means affording improvement in control thereof.

Another, and more specific object, is to utilize D. C. generator means as part of said coordinated control means, and to control the output and connection of said generator means to the energizing coils of said clutches and brakes in a predetermined manner, and A still further object is to provide coordinated control means of the aforementioned type which provide for reversing the output of the generator means to the clutch and brake energizing coils when it is desired to effect rapid deenergization thereof.

Other objects and advantages of the invention will hereinafter appear.

The accompanying drawings illustrate a preferred embodiment of the invention which will now be described in detail, it being understood that the embodiment illustrated is susceptible of modification in respect of details without departing from the scope of the appended claims.

In the drawings:

Fig. 3 is a diagram showing a portion of the control system for the apparatus of Fig. 1.

Fig. 4 shows the remainder of such control system, and

Fig. 5 is a schedule of operating coils and contacts of the relays and contactors shown in Figs. 3 and 4.

Figure 1:
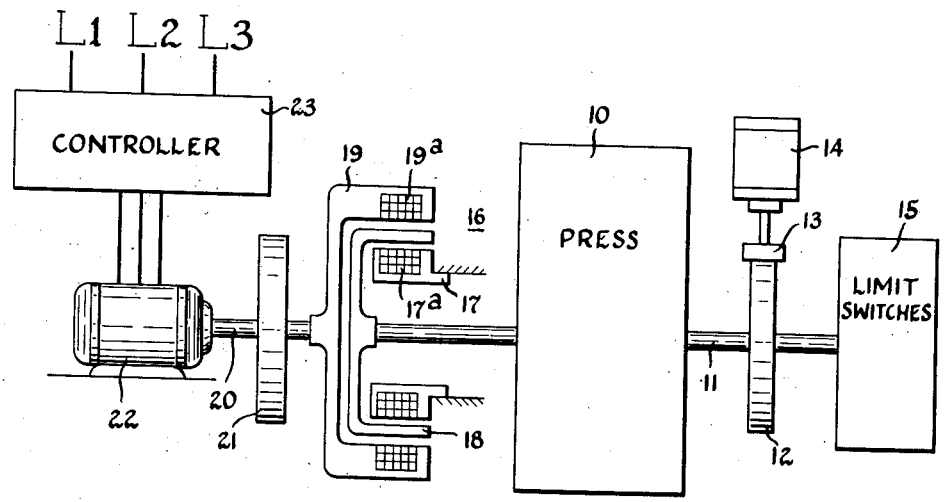
Figure 1 is a schematic showing of a power press and drive control apparatus therefor.

In Fig. 1 there is shown a power press 10, which may be assumed to have a reciprocating ram attached to a crank arm (not shown) that is driven by a shaft 11. A friction brake comprising a drum 12 fixed on shaft 11, a brake shoe 13 and an electromagnetic release coil 14 for shoe 13, is adapted to hold shaft 11 and the ram parts driven thereby in stationary position when coil 14 is deenergized. A group of limit switches, generally designated 15 and to be described hereinafter in more detail in connection with Fig. 4, may be assumed to be operated by shaft 11.

A magnetic flux clutch-brake, generally designated 16 and of the type providing driving torque, or retarding, braking torque variable in accordance with the degree of energization of control coils, has a stationarily mounted member 17 on which is mounted a brake energizing coil 17$^a$. The clutch-brake is further provided with a driven induction member 18 fixed on shaft 11 and having a portion in spaced apart, concentric relation with member 17. A driving member 19, having a clutch energizing coil 19$^a$ mounted on an inner face, is fixed on the end of a shaft 20 and the portion of such member containing coil 19$^a$ is disposed in spaced apart, concentric relation with member 18. The shaft 20 has an inertia flywheel 21 fixed thereon and is driven by a polyphase A. C. motor 22. A controller 23, of any preferred type, is interposed in polyphase A. C. supply lines L1, L2 and L3 and may be assumed to be operable to complete and interrupt the power supply to motor 22.

During periods when press 10 is to be used controller 23 would be operated to maintain motor 22 energized to continuously drive shaft 20 and flywheel 21. If the friction brake is released by energization of coil 14, shaft 11, and hence the press ram, will be driven in accordance with the energization of clutch coil 19$^a$ and brake coil 17$^a$. The improved control system affording control of the energization brake release coil 14, clutch and brake coils 17$^a$ and 19$^a$, and the aforementioned limit switches will now be described in conjunction with Figs. 2 through 5.

As shown in Fig. 3, clutch coil 19$^a$ is connectible in a loop circuit with the armature 25$^a$ of a D. C. generator 25, the normally open contacts 1M2 and 1M3 of an electromagnetic contactor 1M, and one operating coil 1RC1 of a reverse current relay 1RC. Armature 25$^a$ may be driven by any suitable constant speed prime mover, such as for example the polyphase A. C. motor 26 which may be assumed to be running whenever controller 23 is operated to energize driving motor 22. Generator 25 is also provided with a shunt field winding 25$^b$ whose degree and direction of energization is controlled.

A D. C. exciter 27, having an armature 27$^a$ which is also driven by motor 26, and a self-excited shunt field winding 27$^b$, has its armature connected to conductor lines 28 and 29, which may be assumed to have the relative polarities depicted in the drawing. Closure of normally open contacts CF2 of an electromagnetic contactor CF connects the upper end of field winding 25$^b$ to line 28 in series with an adjustable resistor 30, and the simultaneous closure of contacts CF3 of the same contactor connects the lower end of the latter field winding to line 29 in series with normally closed contacts S2 and F2 of electromagnetic relays S and F, respectively. Resistors 31 and 32 are connected between line 29 and resistor 30 and the contacts S2 and F2 when closed effectively shunt resistors 31 and 32, respectively, out of the connection with field winding 25$^b$. Opening of such contacts S2 and F2 provides for effective inclusion of their respective associated resistors in the energizing circuit to afford predetermined amounts of reduction in the energization of winding 25$^b$. Simultaneous closure of normally open contacts CR2 and CR3 of an electromagnetic contactor CR, if contacts CF2 and CF3 are then open, will effect a reverse connection of field winding 25$^b$ across lines 28 and 29 through closed contacts S2 and F2 and an adjustable resistor 33. The latter connection may be considered to be the "field forcing" connection for such field winding, which enables quick reversal in the polarities of the output voltage of armature 25$^a$ and hence rapid, forcing deenergization of clutch coil 19$^a$. Upon complete disconnection of field winding 25$^b$ from lines 28 and 29, any residual energy will be dissipated in a discharge resistor 34 which is connected in parallel with such field winding.

Brake coil 17ª is connected in a loop circuit with armature 36ª of a D. C. generator 36, and with one operating coil 2RC1 of a reverse current relay 2RC. Armature 36ª is driven by motor 26, and has a shunt field 36ᵇ associated therewith. Closure of normally open contacts BF2 of an electromagnetic contactor BF connects the upper end of field winding 36ᵇ to line 28 in series with an adjustable resistor 37, and the simultaneous closure of contacts BF3 of such contactor connects the lower end of the field winding to line 29. Such energizing circuit for field winding 36ᵇ may be considered to be its normal, direct energizing connection. Simultaneous closure of normally open contacts BR2 and BR3 of an electromagnetic contactor BR, accompanied by simultaneous opening of contacts BF2 and BF3 as will be hereinafter more fully explained, will effect a reverse connection of field winding 36ᵇ in series with an adjustable resistor 38 across lines 28 and 29 that effects a "field forcing" connection for the latter field winding to provide quick reversal in the polarities of the output voltage of armature 36ª and hence rapid, forcing deenergization of brake coil 17ª. A discharge resistor 39 is connected in parallel with field winding 36ᵇ to effect dissipation of any residual energy following disconnection from lines 28 and 29.

A polarizing coil 1RC2 of reverse current relay 1RC is connected in series with a resistor 40 across lines 28 and 29 for continuous energization whenever the latter are energized. Relay 1RC has normally open contacts 1RC3 and 1RC4 which are in the portion of the control system to be described in connection with Fig. 4. Similarily, relay 2RC has a polarizing coil 2RC2 connected in series with a resistor 41 across lines 28 and 29, and has normally open contacts 2RC3 which form part of the portion of the control system shown in Fig. 4.

From the foregoing description of Fig. 3, it will be apparent that the control apparatus thereshown, except for the operating coils of reverse current relays 1RC and 2RC, effect control of the immediate energization and deenergization of clutch coil 19ª and brake coil 17ª. The remainder of the control system, to be described in conjunction with Fig. 4, includes means for effecting one preferred sequence in the energization of the clutch and brake coils, such as will effect a desired type of press operating cycle, and also includes certain conventional safety control means usually employed in power press control systems.

As shown in Fig. 4, a source of A. C. voltage supply is provided by lines L4 and L5, which may be assumed to have connection with any two of the supply lines L1, L2 or L3 intermediate motor 22 and controller 23. Thus lines L4 and L5 will be energized when ever controller 23 is operated to supply power to motor 22. The brake release coil 14 of the friction brake is connectible across lines L4 and L5, by closure of contacts 1M4 and 1M5 of contactor 1M, to be energized for release of the friction brake. The primary winding 42ª of a voltage step-down transformer 42 also has connection with lines L4 and L5 for energization thereby. Transformer 42 has a secondary 42ᵇ which is connected at its opposite ends to conductor lines 43 and 44.

The operating coil N1 of a "non-repeat" relay N is connected at an end to line 43 in series with a normally closed "stop" switch 45, normally closed contacts 46ª of a "run" switch 46 and a limit switch 1LS1. Coil N1 is connected at its other end to line 44 in series with a limit switch 1LS2, normally closed contacts 47ª of a second "run" switch 47, and a second normally closed "stop" switch 48. With lines 43 and 44 energized and these various switches in their operating conditions depicted, coil N1 will be energized to close its normally open contacts N2, N3, N4 and N5. Contacts N2 and N3 are connected in shunt with contacts 46ª and 47ª of run switches 46 and 47, respectively, and afford maintenance of the energizing circuit for coil N1 when contacts 46ª and 47ª are opened as a result of operation of switches 46 and 47 to close their respective normally open contacts 46ᵇ and 47ᵇ. Such closure of contacts 46ᵇ and 47ᵇ completes an energizing circuit for the operating coil 1CR1 of a relay 1CR from line 43, through "stop" switch 45, contacts 46ᵇ, the then closed contacts N4, coil 1CR1, the then closed contact N5, contacts 47ᵇ and "stop" switch 48, to line 44. When energized, coil 1CR1 effects closure of its contacts 1CR2, 1CR3, and 1CR4, and also effects opening of its contacts 1CR5 and 1CR6. Closure of contacts 1CR2 and 1CR3 completes an energizing circuit for the operating coil 2CR1 of an electromagnetic relay 2CR, from line 43, through "stop" switch 45, contacts 1CR2, limit switches 2LS1 and 3LS1, coil 2CR1, limit switches 3LS2 and 2LS2, contacts 1CR3 and "stop" switch 48, to line 44. As will be hereinafter more fully explained, closure of contact 1CR2 and 1CR3 also affords a maintaining circuit for coil 1CR1 through limit switches 2LS1 and 2LS2 when either of the "run" switches 46 and 47 are released, or when either of the contacts N4 and N5 open as a result of deenergization of coil N1.

Closure of contacts 1CR4 of relay 1CR results in the connection of the operating coil 1M1 of contactor 1M across lines 43 and 44, for energization of such coil, and also results in connection of operating coil 1TR1 of a time relay 1TR across the same lines for simultaneous energization of the latter coil. Energization of coil 1M1 results in closure of contacts 1M2, 1M3, 1M4, 1M5 and 1M6, and energization of coil 1TR1 results in closure of contacts 1TR2, following a delay period as determined by its associated time delay device 1TR3. Closure of contacts 1M2 and 1M3, connects the armature 25ª in the aforedescribed loop circuit with clutch coil 19ª and coil 1RC1 of reverse current relay 1RC, and closure of contacts 1M4 and 1M5 effects release of the friction brake by energizing brake release coil 14 as aforedescribed.

The aforementioned closure of contacts 1CR4 also connects operating coil CF1 across lines 43 and 44 through contacts 1CR4 and the contacts 2CR2, which latter contacts were previously closed by the concurrent energization of coils 2RC1 and 2RC2 of reverse current relay 2RC, to effect energization of coil CF1. Contacts CF2 and CF3 thereupon close to connect field winding 25ª of generator 25 across lines 28 and 29 in series with adjustable resistor 30 and closed contacts S2 and F2 to energize clutch coil 19ª as aforedescribed. Coil 1RC1 in the loop circuit with coil 19ª is then energized sufficiently to conjointly cause with the then energized coil 1RC2, closure of contacts 1RC3 and 1RC4. Closure of contacts 1RC3, which are in series with the then closed contacts 1M6, establishes an alternative connection to line 43 for the then energized coils CF1, CR1, 1TR1 and 1M1 of relays CF, CR and 1TR, and contactor 1M, respectively, and such alternative connection serves a purpose which will hereinafter be apparent.

Closure of contacts 1TR2, following the aforementioned time delay, results in the connection of the coil F1 of relay F across lines 43 and 44, either through the then closed contacts 1CR4, or through the then closed contacts 1M6 and 1RC3. Coil F1 is then energized to open contacts F2 to shunt resistor 32 in series with field winding 25ᵇ and thereby decrease the energization of the latter.

Assuming that limit switch 5LS is in the open position depicted in Fig. 4, the aforementioned openings of contacts 1CR5 of relay 1CR interrupts the connection from line 43 through the then open contacts 2TR2 of a second timing relay 2TR and operating coil BF1 of relay BF. Such opening of contacts 1CR5, with the simultaneous opening of contacts 1CR6, also interrupts the connection of operating winding 2TR1 across lines 43 and 44 to deenergize the latter coil. Operating coil BR1 of a relay BR will be deenergized due to the fact that its energizing connection is then interrupted by the then open limit switch 5LS and contacts 1CR5. It will be seen that with coils BF1 and BR1 deenergized that field winding 25$^b$ will be completely disconnected from lines 28 and 29 and that brake coil 17$^a$ will accordingly be deenergized. As will be hereinafter explained, the closure of limit switch 5LS effects energization of coils BF1 and BR1 in a certain sequence to energize brake coil 17$^a$ and then quickly deenergize the same.

Operating coil S1 of a relay S is connectible across lines 43 and 44 for energization thereof and consequent opening of its associated contacts S2, as a result of closure of a limit switch 4LS. The operation of limit switch 5LS will hereinafter be explained.

Figure 2:
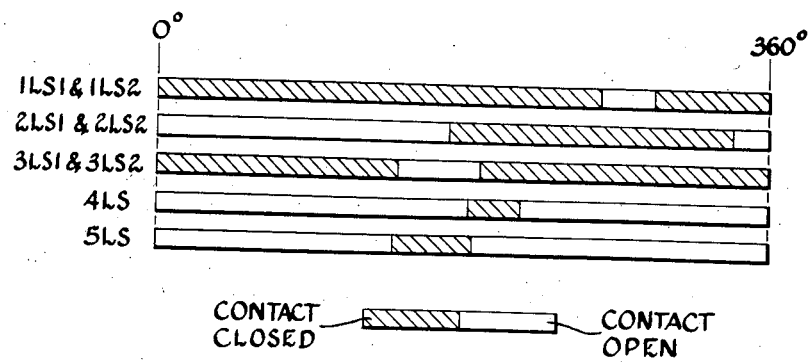
Fig. 2 is a schedule depicting the sequence and duration of operation of certain control apparatus.

Fig. 2 shows a schedule depicting the operating conditions of the various limit switches shown in the circuit of Fig. 4. The horizontal cross hatched and clear areas depicted for any limit switch, designate, respectively, closed and open operating conditions for a single revolution of the press operating shaft 11. It may be assumed that each limit switch is operated by an associated cam fixed on shaft 11 or on an extension thereof to afford the operating cycles depicted in Fig. 2.

The operation of the system as a whole will now be described.

With controller 23 operated to interrupt the connection of motor 22 to lines L1, L2 and L3, motor 22 and lines L4 and L5 will be deenergized. Consequently, lines 43 and 44 of the control circuit will be deenergized, and the various contacts and operating coils of relays and contactors depicted in Figs. 3 and 4 will thus assume the conditions depicted therefor. Let it be assumed that the ram of press 10 is then in its upper normal position. When controller 23 is operated to complete the connection of motor 22 to lines L1, L2 and L3 such motor is thereupon energized to drive shaft 20 and flywheel 21, and lines 43 and 44 of the control circuit are energized. With motor 26 then driving exciter 27, lines 28 and 29 will be supplied with a D. C. voltage and operating coils 1RC2 and 2RC2 of relays 1RC and 2RC will be energized.

With lines 43 and 44 energized, coil N1 becomes energized to close its associated contacts as aforedescribed. Then, upon simultaneous depression of "start" switches 46 and 47, coils 1CR1 and 2CR1 of relays 1CR and 2CR, will accordingly be energized. The closure of contacts 1CR4 energizes coil 1M1 of contactor 1M to close contacts 1M2 and 1M3, which completes the aforementioned loop circuit connections for armature 25$^a$ of generator 25, clutch coil 19$^a$ and operating coil 1RC1 of relay 1RC. The closure of contacts 1CR4 also effects the energization of coil 1TR1, and together with the closure of contacts 2CR2 energizes coil CF1 to effect closure of contacts CF2 and CF3 and completion of the energizing circuit for field winding 25$^b$ of generator 25. Clutch coil 19$^a$ and operating coil 1RC1 of relay 1RC will then be energized. Such energization of clutch coil 19$^a$ results in driving torque being transmitted from shaft 20 to shaft 11 to drive the press ram downwardly toward the work. At the time such coupling is initially effected, both resistors 31 and 32 are effectively out of circuit with the field 25$^b$ of generator 25 due to the fact that contacts S2 and F2 are closed so the degree of coupling will be at a maximum predetermined value, as determined by the adjustment of adjustable resistor 30, to effect rapid build-up of driving torque. After a predetermined time delay, as determined by time delay device 1TR3, contacts 1TR2 close to energize coil F1, whereupon contacts F2 open to insert resistor 32 effectively into circuit with generator field winding 25$^b$. Consequently, clutch coil 19$^a$ is afforded decreased excitation, and the degree of coupling between shafts 20 and 11 is thereby decreased to a lower predetermined value corresponding to drive of the ram downwardly at the normal rate.

Just before the press ram reaches the bottom of its stroke and comes in contact with the work, limit switch 5LS closes to complete the energizing circuit for coil BF1 of relay BF, through the then closed contacts 2TR2. As a result, contacts BF2 and BF3 close to complete the energizing circuit for generator field 36$^b$, and consequently brake coil 17$^a$ and operating coil 2RC1 of relay 2RC are energized. Energization of brake coil 17$^a$ provides a retarding or braking torque on shaft 11 to slow down the ram as it closely approaches the work. The energization of coil 2RC1 results in closing of contacts 2RC3 in conjunction with the already energized coil 2RC2.

Shortly after the closure of limit switch 5LS, limit switches 3LS1 and 3LS2 open and coil 2CR1 is thereby deenergized. The reopening of contacts 2CR2 deenergizes coil CF1 to open contacts CF2 and CF3, and the consequent reclosure of contacts 2CR3 completes an energizing circuit for coil CR1 through the then closed contacts 1RC4 and through the then closed contacts 1RC3 and 1M6. Consequently, contacts CR2 and CR3 are simultaneously closed to reversely energize field winding 25$^b$, and thus rapidly force the dissipation of the magnetic field produced by the preceding normal, direct energization of that field winding. Accordingly, the driving torque coupling between shafts 20 and 11 is quickly reduced to zero as braking torque is being applied on shaft 11. The press ram is accordingly rapidly slowed down as it approaches and initially engages the work.

When the voltage generated by armature 25$^a$ is reduced to zero and starts to build up in the reverse direction, coil 1RC1 bucks coil 1RC2 and consequently contacts 1RC3 and 1RC4 open. Opening of contacts 1RC4 results in the deenergization of coil CR1, and the consequent opening of contacts CR2 and CR3 results in the opening of the reverse energizing connections for generator field winding 25$^b$. Thus, any appreciable reverse energization of clutch coil 19$^a$ is prevented.

While limit switches 3LS1 and 3LS2 are open, the previously open limit switches 2LS1 and 2LS2 close to provide a maintaining circuit for coil 1CR1 around contacts 46$^b$ and 47$^b$ of "run" switches 46 and 47 to insure continual energization of relay 1CR in the event switches 46 and 47 are thereafter released.

Reopening of limit switch 5LS results in deenergization of coil BF1 and the consequent opening of contacts BF2 and BF3 of course interrupts the normal, direct energizing connections for generator field winding 36$^b$, and the simultaneous closure of contacts BF4 results in the completion of the energizing circuit for coil BR1 of relay BR through the then closed contacts 2RC3 of relay 2RC. Accordingly, contacts BR2 and BR3 are closed to complete the reverse energizing connection for generator field winding 36$^b$. Consequently brake coil 17$^a$ is immediately deenergized to rapidly remove the braking torque than being exerted on shaft 11. As the direction of the voltage generated by armature 36$^a$ reverses, coil 2RC1 bucks coil 2RC2, and consequently contacts 2RC3 reopen to deenergize coil BR1 and thus interrupt the reverse energizing connections for generator field winding 36$^b$. The field forcing deenergization of brake coil 17$^a$ is thus interrupted before any appreciable reverse excitation of such coil can occur. Any residual energy is then dissipated in resistor 39.

The closure of limit switch 4LS results in the energization of coil S1 of relay S, and the consequent opening of contacts S2 effectively connects the resistor 31 in circuit with generator field winding 25$^b$, so that upon subsequent reclosure of contacts CF2 and CF3 to complete the normal direct energizing circuit for the latter field winding it is afforded reduced excitation.

Reclosure of limit switches 3LS1 and 3LS2 results in reenergization of coil 2CR1, and in the consequent reclosure of contacts 2CR2 and reopening of contacts 2CR3. Reclosure of contacts 2CR2 of course results in reenergization of coil CF1 and in the consequent closure of contacts CF2 and CF3 to complete the normal, direct energizing circuit for generator field winding 25$^b$. The latter is then energized to the last mentioned reduced degree and clutch coil 19$^a$ is accordingly energized to a corresponding degree. This results in recoupling of shaft 20 to shaft 11 to effect exertion of driving torque on the latter shaft. Accordingly, the arm is accelerated, and driven to the bottom of its stroke and then in the upward direction toward its upper normal position. Shortly thereafter limit switch 4LS reopens to deenergize coil S1 and reclose contacts S2. The reclosure of contacts S2 again effectively takes resistor 31 out of circuit with generator field winding 25$^b$ to afford increase in the energization of clutch coil 19$^a$ and consequent increase in the degree of driving torque on shaft 11, to thereby increase the speed at which the ram moves toward its upper normal position.

Before the press ram reaches its upper normal position limit switches 1LS1 and 1LS2 momentarily open and then reclose. Such opening of switches 1LS1 and 1LS2 insures that coil N1 of "Non-Repeat" relay N will be deenergized to open its contacts, even though run switches 46 and 47 may be held down to maintain their respective contacts 46$b$ and 47$b$ closed. Such action thus requires that run switches 46 and 47 be released for return to their normal operating positions depicted in Fig. 4 before another cycle of operation can again be initiated.

Just before, or as the press ram reaches its upper normal position, limit switches 2LS1 and 2LS2 open, thereby deenergizing relay coils 1CR1 and 2CR1. Accordingly, coil 1M1 and relay coils CF1, F1 and 1TR1 are deenergized, and relay coils BF1 and 2TR1 are energized by reclosure of contact 1CR5 and 1CR6. Consequently, clutch coil 19$^a$ is quickly deenergized by forcing generator field 25$^a$ in the manner aforedescribed, brake coil 17$^a$ energized, and brake release coil 14 deenergized to set the friction brake. After a time delay period, as determined by time delay device 2TR3, contacts 2TR2 open, thereby affording deenergization of coil BF1, and consequent deenergization of brake coil 17$^a$ which is "forced" by reclosure of contacts BF4 to complete an energizing circuit for coil BR1 through the then closed contacts 2RC3. Contacts 2RC3 ultimately reopen as aforedescribed to disrupt the reverse energizing connection for field winding 36$^b$.

The generators 25 and 36, and exciter 27 under certain conditions might be driven by the press driving motor rather then requiring a separate motor, such as the motor 26 depicted in Fig. 3. Although clutch-brake 16 is shown and described as a unitary device, separate magnetic clutches and magnetic brakes can be used in lieu thereof. These can be of the electrodynamic or eddy-current type, or of the magnetic particle type.

In a commercial embodiment, a plurality of "run" switches connected in series would be used to insure that each worker attending the press would have to operate one such switch with each of his hands to initiate the cycle of operation. This arrangement is of course well known.

It will be understood that this invention is in nowise limited to the particular operating cycle hereinbefore described, and the points of operation of the limit switches and the duration thereof in an operating cycle can be varied to suit particular conditions.

If one or the other steps, or both steps, of reduced energization of clutch coil 19$^a$ is not required, then either or both of the resistors 31 and 32, can be eliminated together with their respective controlling relays S and F. If relay F is eliminated, then relay 1TR can also be eliminated, and if relay S is eliminated then limit switch 4LS can also be eliminated. In some instances "forcing" deenergization of the brake coil 17$^a$ may not be necessary in which event relays BF and 2RC and limit switch 5LS may be eliminated.

We claim:

1. For controlling the operation of a cyclically operating machine provided with a magnetic flux clutch and a magnetic flux brake, the combination comprising a pair of D. C. generators each of which has a main flux producing shunt field winding and has its armature connectable in circuit with a respective one of said clutch and said brake for energization of the same in accordance with the degree and direction of energization of their respective shunt field windings, and electrical means including control means operable to afford selectively normal constant excitation of either of said shunt field windings and to reversely excite at least one of said shunt field windings to rapidly reduce the armature voltage of the generator associated therewith.

2. The combination according to claim 1 wherein said control means comprises means responsive to reversal in polarity of the armature voltage of the generator whose shunt field is reversely excited to interrupt the reverse excitation of such shunt field.

3. The combination according to claim 1 wherein said control means includes means whereby the degree of energization of said shunt field windings can be adjusted.

4. The combination according to claim 3 wherein said electrical means include a source of constant direct voltage supply to which said shunt field windings are reversibly connected by said control means to afford the aforementioned normal and reverse excitation thereof.

5. The combination according to claim 4 wherein said control means comprises means responsive to reversal in polarity of voltage to which said shunt field windings are subjected to interrupt their respective reverse excitations.

6. The combination according to claim 5 wherein said source is a D. C. exciter which is driven in synchronism with said D. C. generators.

7. The combination with a power operated machine provided with magnetic flux clutch and magnetic flux brake, of D. C. generators each of which has its armature individualized to a respective one of said clutch and said brake and each of which has a main flux producing shunt field winding, and electrical means including control means operable to individually energize said shunt field windings for individually normally exciting said clutch and brake for effecting coupling and braking thereby, respectively, and to reversely excite said clutch for rapid deenergization of the same following its normal excitation.

8. The combination according to claim 7 wherein said control means also effects individual reverse excitation of said brake for rapid deenergization of the same following its normal excitation.

9. The combination according to claim 8 wherein said electrical means includes a source of constant direct voltage to which the shunt field windings of said generators are normally and reversely connected to effect the aforementioned normal and reverse excitations of said clutch and said brake.

10. In control means for a power press or the like having an operating shaft, magnetic flux clutch energizable to vary the driving torque transmitted to said operating shaft in accordance with its energization, magnetic flux brake energizable to exert retarding torque on said shaft in accordance with its energization, D. C. generators each of which has its armature individualized to a respective one of said clutch and said brake and each of which has a main flux producing shunt field winding, electrical means for individually energizing said shunt field windings to individually normally excite said clutch and brake and to reversely excite said clutch for rapid deenergization thereof, and control means for said electrical means operable to provide in cyclic sequence normal energization of said clutch, concurrent normal and reverse energization of said brake and clutch, respectively, normal energization of said clutch, and concurrent reverse and normal energization of said clutch and brake respectively.

11. The combination according to claim 10 wherein said control means includes means responsive to reversal in polarity of the voltage to which the shunt field winding of the generator associated with said clutch is subjected to interrupt its aforementioned reverse excitation.

12. The combination according to claim 10 wherein said control means effects operation of said electrical means to reversely excite the shunt field winding of the generator associated with the brake to afford reverse energization of the latter following its normal energization in the aforementioned cyclic sequence.

13. The combination according to claim 12 wherein said control means includes means responsive to reversal in polarity of the voltage to which said shunt field windings are subjected to interrupt their respective reverse excitations.

14. The combination according to claim 13 together with a friction brake associated with the press operating shaft and having electro-responsive release means under the control of said control means to respectively afford release and setting of such friction brake at the beginning and end of a cyclic sequence.

15. The combination according to claim 14 wherein said control means comprises switches operable in a predetermined relation to the rotation of said drive shaft to direct the aforementioned cyclic sequence.

References Cited in the file of this patent

UNITED STATES PATENTS

| | | |
|---|---|---|
| 2,411,122 | Winther | Nov. 12, 1946 |
| 2,471,505 | Winther | Mar. 31, 1949 |

FOREIGN PATENTS

| | | |
|---|---|---|
| 576,558 | Great Britain | Apr. 10, 1946 |